ations 12/30/80 XR 4,241,608

United States Patent [19]
Dees et al.

[11] 4,241,608
[45] Dec. 30, 1980

[54] ULTRASONIC SCANNER

[75] Inventors: Raymond K. Dees, Westminster; Peter J. Van Laanen; Gregory L. Ream, both of Boulder, all of Colo.

[73] Assignee: Unirad Corporation, Denver, Colo.

[21] Appl. No.: 871,785

[22] Filed: Jan. 24, 1978

[51] Int. Cl.³ .............................................. G01N 29/00
[52] U.S. Cl. ...................................... 73/606; 128/660; 73/626
[58] Field of Search ........... 128/2 V, 205 Z, 660–663; 73/609–614, 621–626, 606; 340/1 R; 343/5 SC; 364/577; 358/113

[56] References Cited
U.S. PATENT DOCUMENTS

| 3,778,756 | 12/1973 | Houston et al. | 340/5 MP |
|---|---|---|---|
| 3,778,757 | 12/1973 | Houston | 340/5 MP |
| 3,789,833 | 2/1974 | Bom | 128/2 V |
| 3,864,660 | 2/1975 | Ranalli et al. | 340/1 R |
| 3,881,466 | 5/1975 | Wilcox | 128/2 V |
| 3,911,730 | 10/1975 | Niklas | 73/67.7 X |
| 3,918,024 | 11/1975 | Macovski | 73/626 X |
| 3,919,683 | 11/1975 | Itamura et al. | 340/1 R |
| 3,954,098 | 5/1976 | Dick et al. | 128/2.05 Z |
| 4,029,948 | 6/1977 | Hounsfield | 364/577 X |
| 4,038,668 | 7/1977 | Quarton | 340/324 AD |
| 4,058,001 | 11/1977 | Waxman | 358/112 X |
| 4,058,003 | 11/1977 | Macovski | 128/2 V X |
| 4,064,741 | 12/1977 | Reynolds | 73/620 |
| 4,070,642 | 1/1978 | Iinuma et al. | 73/620 X |
| 4,075,598 | 2/1978 | Takamizawa et al. | 340/1 R |
| 4,094,306 | 6/1978 | Kossoff | 128/660 |
| 4,117,446 | 9/1978 | Alais | 358/112 |
| 4,121,250 | 10/1978 | Huelsman | 358/112 |
| 4,127,034 | 11/1978 | Lederman et al. | 73/626 |
| 4,135,140 | 1/1979 | Buchner | 73/626 |
| 4,149,420 | 4/1979 | Hutchison et al. | 128/660 |
| 4,159,462 | 6/1979 | Rocha et al. | 73/626 |
| 4,161,121 | 7/1979 | Zifelli et al. | 128/660 |
| 4,161,122 | 7/1979 | Buchner | 128/660 |

FOREIGN PATENT DOCUMENTS 2443686  4/1976  Fed. Rep. of Germany .............. 73/626

OTHER PUBLICATIONS

Souquet, J. et al., "Chirp-Focussed Transmitter Theory", 7th Annual Symp. on Acoustic Imaging & Holography", pp. 475–493.
Bom, N. et al., "An Ultrasonic Intracardiac Scanner", Ultrasonics, Mar. 1972, pp. 73–76.
Baum, "Quantized Ultrasonography", Ultrasonics, Jan. 1972, pp. 13–15.
Milan, J., "An Improved UTS Scanning System Employing A Small Digital Computer", Brit. Jrnl. Rad., #45, 1972, pp. 911–916.
Harlice, J. F. et al., "An Electronically Focussed Acoustic Imaging Device", Microwave Lab., Hansen Lab. of Physics, Stanford Univ., Stan. Cal. 94305, (date unknown), pp. 317–333.
*Diagnostic Ultrasound Imaging System*, (author anon.), Research Disclosure, No. 152, pp. 16–17, Ind. Opport. Ltd., Homewell Eng., Dec. 1976.
Bom, N et al., "Two Dimensional Real Time Echocardiography", Ch. 9, in *Recent Advances in Ultrasound in Biomedicine*, vol. 1, 1977, pp. 206–209.

*Primary Examiner*—Robert W. Michell
*Assistant Examiner*—Francis J. Jaworski
*Attorney, Agent, or Firm*—Fay & Sharpe

[57] ABSTRACT

An ultrasonic transducer system comprising a transducer array, control circuit and display system wherein the control system is able to actuate the transducer elements in groups of N and N+1 elements, actuate the groups in non-sequential order, actuate groups of selectively different sizes, subject the actuation signals to and the echo signals from the transducers to pre-programmable delay periods, compress the echo signals into a logarithmic representation, transform the echo signals into plural simultaneous visual displays on a standard TV monitor in split screen format, and transform the display of discrete points in the visual display into continuous lines. Further, each transducer element in the array may consist of a split or paired set of transducers.

27 Claims, 17 Drawing Figures

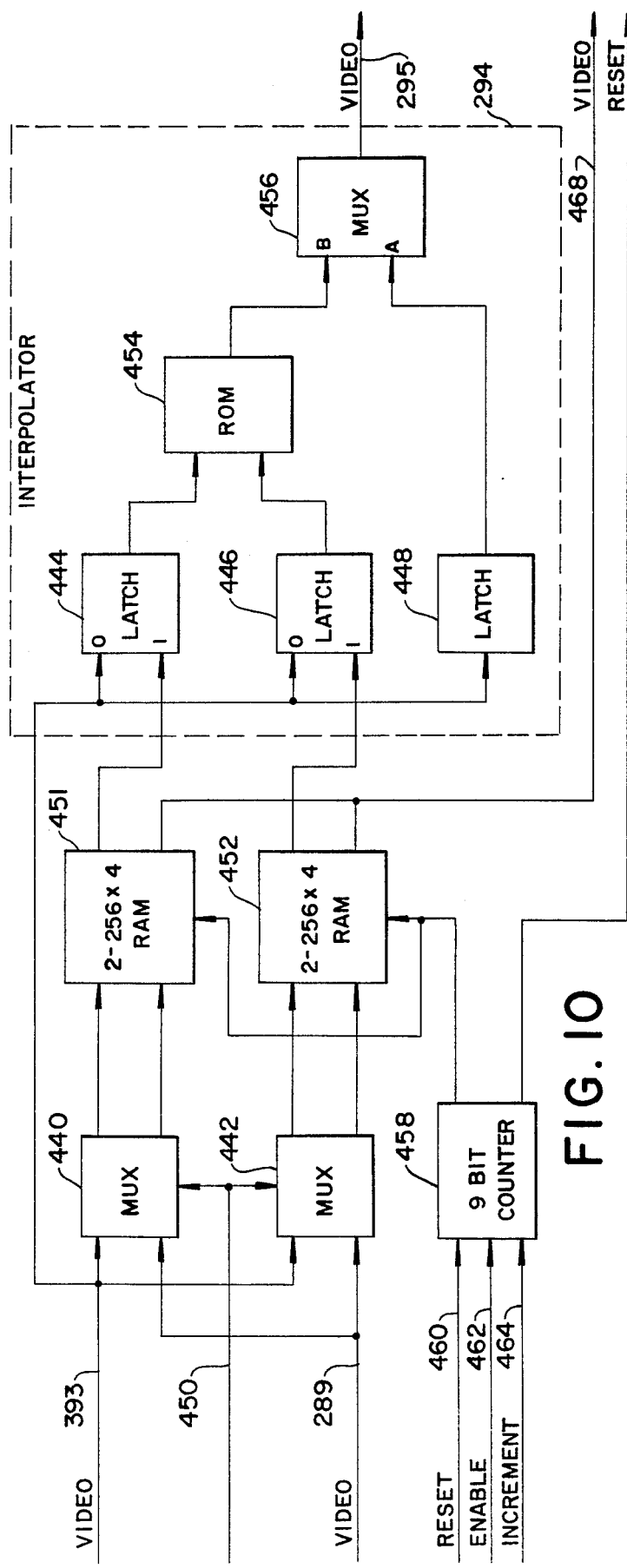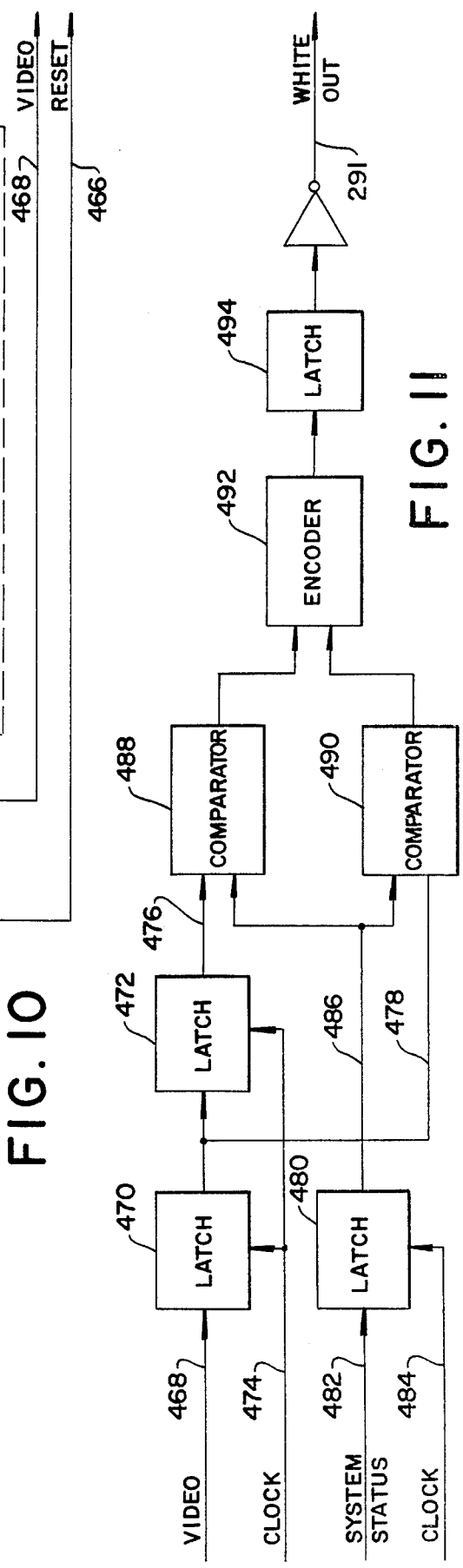

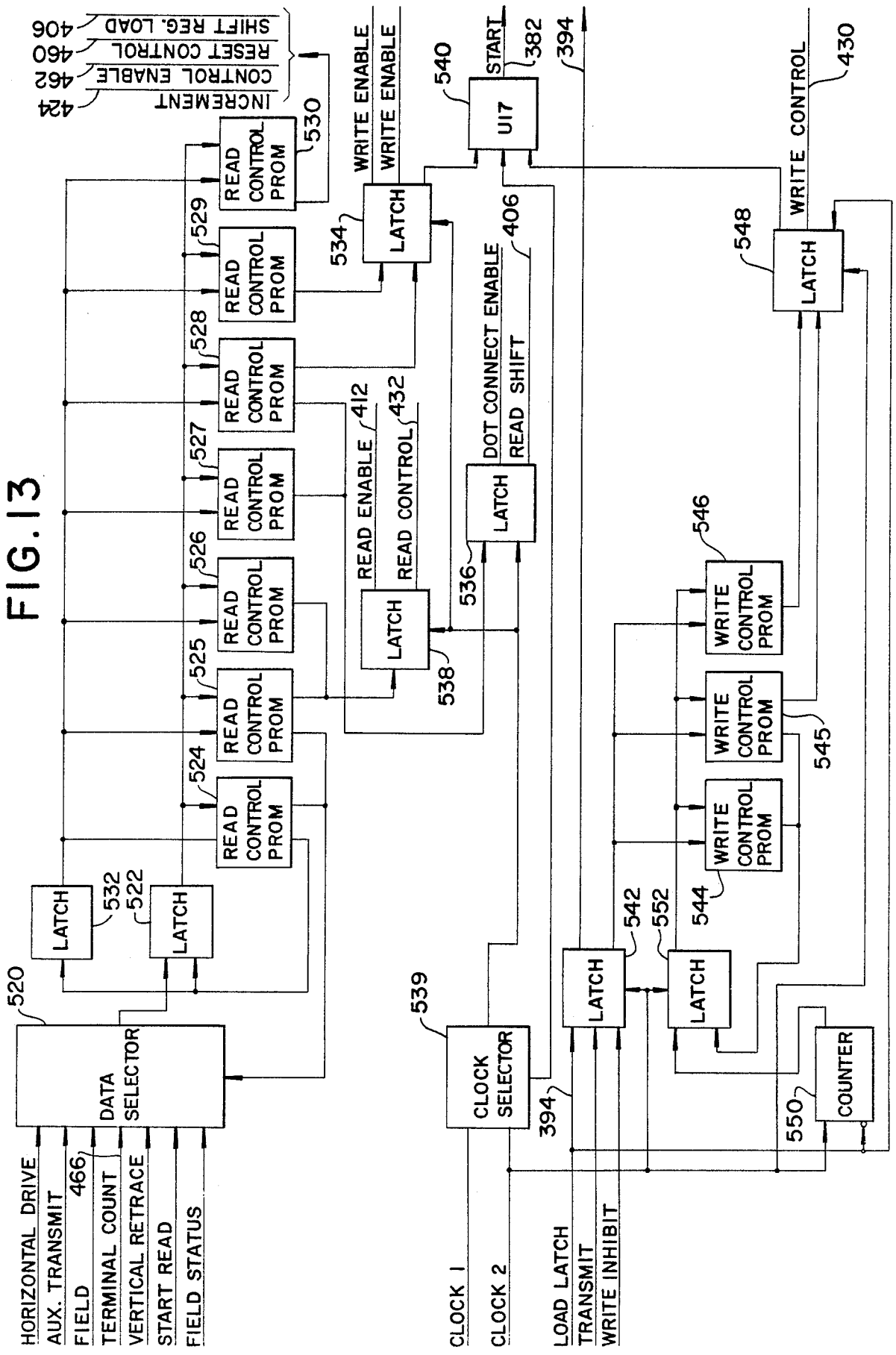

ULTRASONIC SCANNER

BACKGROUND OF THE INVENTION

The present invention relates to ultrasonic diagnostic equipment. In particular, the invention relates to a hand-held array of ultrasonic transducers which are positioned over the object, such as a human body, to be examined and to the associated signal producing, processing and display equipment which provides the operator with an output indicative of the cross section of the body below the hand-held device. Although ultrasonic diagnostic equipment has been used for several years, the present invention is an improvement over previous units because it has much greater versatility, resolution, and freedom from distortion.

Twice the horizontal resolution of the earlier units is made possible in the present invention by using a unique method of actuating odd and even numbers of transducer elements. This method provides twice as many lines of data for each view of the object examined.

To reduce spurious signals resulting from grating-lobe responses, the present invention uses a novel structure for transducer elements. Each transducer element is divided in half or comprised of two transducer elements coupled in parallel at each transducer element position. This parallel transducer arrangement achieves a significant reduction in spurious responses.

The present invention provides for more precise focusing than previous machines. One way is by allowing the user to select any one of a number of apertures, i.e. select the number of transducer elements which will be pulsed as a group. By making the size of the aperture variable, the present machine has better resolution at both shallow and deep depths. Because pulsing larger numbers of transducer elements per group will produce the best focusing and depth of field at greater depths within the object to be examined, whereas pulsing a relatively small number of transducer elements will produce the best focusing at depths closer to the surface of the object being examined, previous fixed aperture machines are not able to match the present resolution over the full shallow to deep range. Although others have devised transducer probes which actuate different numbers of transducer elements at the same time, for example see U.S. Pat. No. 3,911,730, the invention herein recognizes the relationship between the length (number) of the group of transducer elements pulsed and the focus of the resulting picture at the depth of interest.

Another way in which the focusing is improved is by shaping the transmitted signal from the ultrasonic probe into a generally arc-like wave which converges at the depth of interest by using a number of delay circuits to modify the relative actuation time of each element within the group of transducers being activated in such a manner that each point on the resulting wave front reaches a point at the depth of interest at the same time. U.S. Pat. No. 3,919,683 illustrates the use of delay circuits to help focus the wave front, but unlike the present invention it requires a separate delay circuit for every pair of elements within each group of transducers. The present invention does not use a fixed ratio of delay circuits to elements within the group. Instead it recognizes that a small number of delay circuits which can be programmed for different delay periods can produce the same results with less hardware, i.e. cost.

Analogously, the present invention uses small numbers of programmable delay circuits to bring echo signals received by the transducer elements into coincidence before processing them to form the visual display.

Simplification of the post processing of the echo signals is achieved by using a log compression system. In the log compression system, the amplitudes of the echo signals are transformed into their logarithmic equivalents. This allows the system to handle a wide echodynamic range and reduces the equipment necessary to transform these signals into a video picture. Logarithmic intensity modulation circuits per se are not new, for example see U.S. Pat. No. 3,881,466 which uses logarithmic intensity modulation circuitry in conjunction with an oscilloscope display.

Another unique feature of the present invention is its display format. The display is such that it can be produced on a standard TV screen. This is accomplished first because the invention doubles the number of data lines produced without increasing the number of transducer elements, and second because the interpolation system of the present invention increases the number of data lines still more. In this manner, a small hand-held array, such as one with sixty-four transducer elements, can produce a sufficient number of different data lines to equal the number of raster scan lines being used.

A digital memory for the data allows the picture on the TV screen to be frozen, allows easy interfacing with video tape and photograph equipment, allows instant storage of any image regardless of transducer movement, and allows a variable gray scale display.

Another advantage of the present invention is that it is able to make a split screen presentation of the data. That is to say, part of the screen can be used to show one representation, such as the cross sectional picture of the examined object, and another portion of the screen can be used to produce an ECG signal, an A scan, a time gain compensation curve, time motion, or any one of a number of other related or independent representations. Both displays can then be photographed in a single frame of film with a camera, such as the DELTA-MAT manufactured by Ohio-Nuclear, Inc.

A unique method of dual encoding minimizes hardware required. In the present invention each transducer element requires two enable signals in order to be activated. The same hardware can be used to determine the timing and sequencing and provide a first enable signal to a plurality of elements and the second enable signal to select among this plurality of elements. This reduces the timing and sequencing hardware to a fraction of the hardware needed in a single encoding system.

A PROM based scan generator enables the present invention to select groups of transducer elements which can be activated from left to right, right to left, or most importantly, in a non-sequential manner. By activating the groups in a non-sequential manner, the present invention is able to improve picture quality by reducing spurious echoes and signals from the preceding ultrasonic pulse and decrease the time between actuating subsequent groups. Further, the PROM based scan generator allows the invention to alternate between different modes of activating the transducer elements and group of elements. The invention can alternate between the modes of actuation needed to produce selected displays of the split screen format.

Additionally, the present invention includes an improved display format for one dimensional displays, such as an A scan. The data received by the transducers would normally produce a series of discrete data values which would show up on a cathode ray tube, such as a TV screen, as a series of dots. To overcome this, the present invention includes a further interpolation possessing means which functions to connect the dots and turn the display into a continuous line.

BRIEF DESCRIPTION OF THE DRAWINGS

FIG. 10 is a block diagram of the A-mode/TGC Generator of FIG. 6 and of the interpolator module of FIG. 6;

FIG. 11 is a block diagram of the dot connector of FIG. 6;

FIG. 13 is a block diagram of the digital video control module of FIG. 6; and

DESCRIPTION OF THE PREFERRED EMBODIMENT

By way of very basic background, some ultrasonic viewing instruments have an array of transducer elements. This array may be linear, as in the preferred embodiment, or it may take some other form, such as matching the external contour of the object to be examined. The transducer elements, of course, are small crystals which when subject to an electrical impulse can be caused to oscillate at a known frequency, and conversely when the crystals are subject to sound oscilations of the same frequency they will produce small electrical impulses.

Sound waves will travel through a homogeneous medium at a constant rate of speed with a gradually attenuating amplitude. If the medium, however, is not fully homogeneous but has some sort of impurities or interfaces where it changes nature, then the sound waves upon striking the interface or impurities will be partially transmitted and partially reflected. Those that are transmitted will continue on through the second medium until they again strike another impurity or interface. Again, some of the sound wave will be reflected and some transmitted. This will continue until the sound wave is fully attenuated.

Figure 1A:
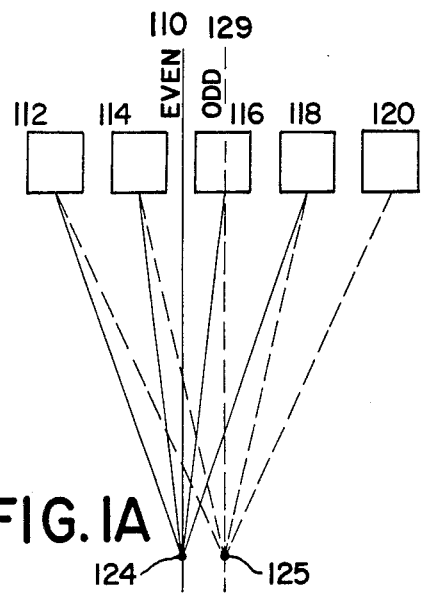
FIGS. 1A and 1B illustrate the relationship between the transducer elements and the data line.
Figure 1B:
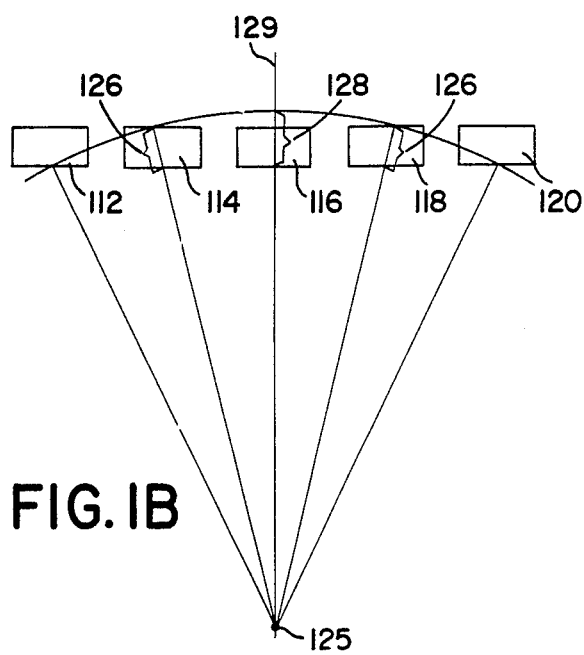

In order to determine where in the medium the irregularity which is causing the echo is located, the transducer elements are operated in pairs, note FIGS. 1A and 1B. For purposes of illustration, a line 110 is shown perpendicular to the array of transducers and centered within a group 112–118 of transducers to be activated. By operating pairs of transducers which are equally spaced from this line at the same time, the sound waves from each pair of transducers will arrive at any point on the line simultaneously.

Similarly, an echo from any point on the line 110 will impinge upon both transducers of one of these pairs simultaneously. For example, an echo from point 124 will reach transducers 112 and 118 simultaneously. It is then a simple matter to reject all echoes not received simultaneously by each element of a pair. For example, if the echo signals from transducers 112 and 118 are summed into a resulting train of output pulses, then those pulses that are representative of echoes which were received at both transducers simultaneously will be overlapped so as to be twice as high as similar echoes which were received at only one or the other. Thus, by summing the output of each pair and appropriately filtering the sum, only those signals which are indicative of interfaces along data line 110 can be retained.

It will be noted that when an even number of transducers per group are used and adjacent groups of transducers are actuated, the data line will shift by the width of one transducer element. Because the present invention allows the number of transducers actuated as a group to vary, the present invention is able to shift the data line only one half the width of a transducer element to line 129. It does this by actuating an even number of transducers, such as the four 112 to 118 illustrated in FIG. 1A, and subsequently actuates an odd number of transducers, such as the five 112–120. When five transducers are actuated, transducers 112 and 120 would be operated as a pair, 114 and 118 as a pair, etc.

Center element 116 may be (1) passive, (2) active, or (3) active in the transmission mode and passive in the reception mode. In the transmission mode, it is desirable for the center element to be active in order to create as strong a sound wave as possible. However, in the receiving mode the center element has no mirror image twin, as do all the other receiving elements. Thus, operating alone, it has no ability to descriminate between echoes from the data line and from other places within the medium. This could be overcome by having a time varying delay means operating in conjunction with the center element and one or both of the adjacent elements. For any point along the data line, it is a simple geometric calculation to determine the difference in path length the echo would travel for a point on the data line to a center transducer and the next adjacent transducer. Of course, as a point from which the echo is reflected became deeper within the object, the difference in path length would become less. Thus, in examining points a large distance from the transducer array, the difference in path length from the point where the echo originates to the center transducer and its next transducer will become insignificant. At this point, the center transducer can be coupled with its adjoining two transducers, and the trio operate together in much the same manner that the other pairs operate. In sum, the actuation of even numbers of transducers will produce a data line between every pair of transducer elements, and the actuation of odd numbers of transducer elements will produce a data line centered below each transducer element.

Similarly, it will be noted that crystals further along the array from data line 110 have a longer path to any given point on the line. For example, to view an organ located near point 125 in FIG. 1B, it is desirable to pulse the respective pairs of transducers such that the wave front from transducers 112 and 120 arrives at point 125 at the same time as the wave front from transducers 114 and 118 and the wave front from single transducer 116. It is apparent from the geometry of the system as illustrated in FIG. 1B that transducers 114 and 118 are closer to point 125 than transducers 112 and 120 by path length difference 126 and the transducer 116 is closer still to point 125 by a path length difference 128. Further, from the speed at which sound of the frequency used propagates through the medium, the time difference between pulsing transducter pairs 112-120 and 114-118 and the time difference between pulsing transducer pair 114-118 and single transducer 116 for the sound waves to traverse the two paths is readily calculated. Accordingly, if the actuation of transducers 114 and 118 were delayed this amount of time after the actuation of transducers 112 and 120 and transducer 116 were delayed after the actuation of transducers 114 and 118, the sound waves from the set of four transducers would arrive simultaneously at point 125. The present invention has found that when a large group of transducers is used, for example sixteen transducer elements, the difference in path length between adjacent transducers tends to be relatively small compared to the difference in path length between the center most transducer and the outer most transducer. Accordingly, the present invention has found that it is unnecessary to have a different time delay for every pair of transducer elements. Indeed, the preferred embodiment of the present invention illustrates only one nondelay and two different delay periods for up to sixteen transducer elements. With these three relative times, the present invention simplifies the equipment, saves the cost of unnecessary parts yet is still able to get superior resolution.

Looking to the processing of the signals produced by the transducers upon being struck by the echoes, the signals from each crystal of a pair, equally spaced from the center line, are summed. As noted above, this summing enhances the signals resulting from echoes from interfaces on the data line. Similarly, if the output from adjacent transducers is delayed by a time corresponding to the difference in time necessary for sound to traverse the distance between an echo point and each transducer, then summed signals produced by echoes from points on the data line will be yet more enhanced. Because the delay causes the signals received by all the transducers from interfaces on the data line to be summed, but does not cause summing of signals from interfaces at other points in the medium, the amplitude of signals caused by echoes from points along the data line will be much greater than from echoes from other points in the medium. Thus, the resolution can be greatly increased, especially around the depth of interest.

By using a programmable read only memory (PROM), the present invention is able to actuate different numbers of transducer elements. It will be noted that for a point on the data line relatively close to the transducers, the distance between transducers close to the data line and the point will be in great disparity with the distance between those greatly distant from the data line and the point. But, for points of interest a relatively long way down the data line, the relative distance between the center most transducers and the points and further most transducer and the points are not that great. Thus, the present invention's ability to change the number of transducers in a group enables it to use a relatively small number, as small as three or four, when the primary field of interest is very close to the surface, which helps reduce distortion caused by elements which are greatly divergent in relative distances from the point of interest; and as many as sixteen when the primary field of interest is a large distance from the transducers, which reinforces the signal and provides better pictures from points a long distance from the detectors.

Figure 2:
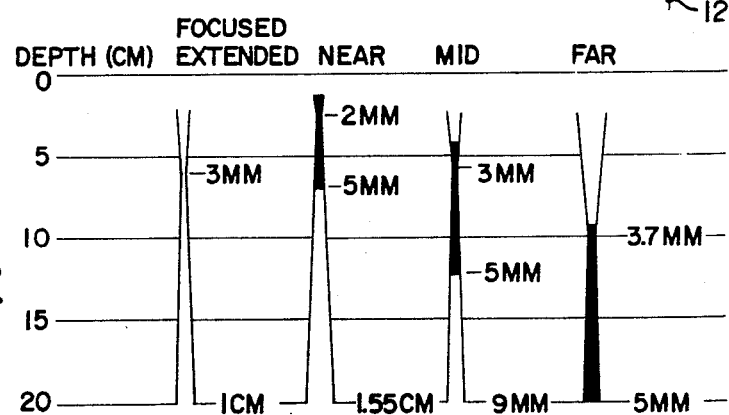
FIG. 2 is a diagram of focusing beam paths.

FIG. 2 illustrates how changing the aperture size, i.e. number of transducers per group, and varying the period of delay between actuation of the elements and on the echoes signals acts to focus the beams for different depths. As indicated above, the near beam is produced by a relatively small number of transducer elements, for example four or five, with relatively short delay periods. FIG. 2 shows that the near beam has its sharpest focus at about two and one half centimeters from the surface for a 2.25 Mhz transducer. At this depth, the focus is to approximately two millimeters, i.e. the exact position laterally of an interface can be determined to within two millimeters. As the wave front passes the two and one half centimeter depth, it starts to diverge slowly. At about seven centimeters, the focus is only five millimeters. Interfaces deeper than seven centimeters will still produce echoes which will be transformed into a video picture, but the picture will have less resolution, i.e. be fuzzier, with increasing depth. This loss of resolution is in large part caused by the choice of delay periods. For the near beam, the delay times were chosen such that the waves from each transducer would arrive simultaneously at roughly two and one half centimeters and signals produced by echoes from interfaces at two and one half centimeters would be delayed such that they would be coincident. As the depth increases, the waves from pairs of transducers further from the data line will arrive increasingly before the transducers closer from the data line; and the signals from the transducers caused by the echoes will progress from coincident to partially overlapping to no enhancement from other pairs of transducers.

In the preferred embodiment, up to about five millimeters is considered satisfactory resolution. If the operator desires to observe a depth beyond seven centimeters, a mid or far focus is recommended. It is recommended that a focus be chosen such that the exact depth of interest is the same as the depth of sharpest focus.

The far focus, in the preferred embodiment, uses up to sixteen transducers and as illustrated has its sharpest focus at ten centimeters with good resolution from nine to twenty centimeters. The mid focus uses, in the preferred embodiment, between six and fourteen transducer elements. Although only one mid focus is illustrated, it is understood that several are possible—from one that focuses just deeper than the near beam, to one as illustrated in FIG. 2, to one that focuses just shallower than the far beam. It will be appreciated that with appropriate delay intervals and numbers of transducer elements, focusing can be achieved at greater depths than illustrated in FIG. 2.

Figure 3A:
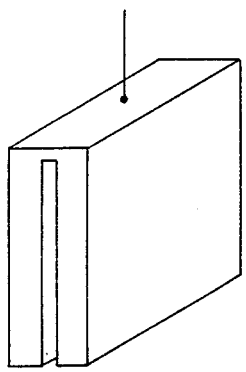
FIG. 3A shows the split transducer element and FIG. 3B the coupled transducer elements.
Figure 3B:
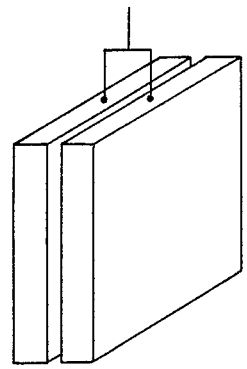

The present invention has also found that a reduction in the spurious signals resulting from grating-lobe responses can be achieved by using split transducer elements. As illustrated in FIG. 3A, each transducer element, such as transducer 112 of FIG. 1A, is divided into two parts. This division can be accomplished by cutting a very narrow slit most of the way through the transducer element with only a small area bridging the two halves. Alternately, similar results can be achieved by juxtaposing two transducer elements, as illustrated in FIG. 3B, and coupling them together electrically. As will be seen in the description of the circuitry, the circuit will treat the slit or coupled pair of transducers as if they were a single transducer element.

The circuit of the present invention also produces many advantages in the display format. One feature is the split screen display on the video output monitor. It will be appreciated that actuating every group of N adjacent transducers as well as every group of N+1 adjacent transducers in an array will produce a series of data lines, such as 110 and 117, along the entire array of transducer elements. By arranging the data lines in order, and placing the signals representing these data lines on the raster scan of the TV monitor such that the relative peaks and valleys produce the appropriate shades of white, gray and black, an image representative of the cross section of the object examined can be produced. This, however, is not the only display which is desirable to the technician operating the machine. The technician often needs to view other visual data representations at the same time, for example, the technician may also wish to have an A scan displayed simultaneously. It will be appreciated that an A scan is a line representation of the data along the single data line in which the interfaces cause peaks to be deflected on the line. The amplitudes of the peaks are indicative of the nature of the interface. The present invention is able to display this split screen format because the control for actuating the transducer elements is able to alternate between the relative modes of actuation of the different groups of transducer elements necessary to produce the two different displays and because the echo signals are processed through a memory where the signals for producing the video display are temporarily stored.

It will further be appreciated that the one hundred twenty data lines which the preferred embodiment is able to produce with only sixty-four transducers is insufficient to fill the over five hundred raster scan lines of a normal TV monitor. The shortage of data lines could be resolved by increasing the size of the transducer array. However, unless the size of the individual transducers were shrunk proportionally to the increase in number, the resulting picture would just represent a larger area not greater detail. Another solution is to repeat each actual data line several times which produces satisfactory results. The best solution is to interpolate the actual data lines to create additional data lines that are some averaged value of their surrounding data lines. Because of the split screen format of the preferred embodiment which alots only three hundred sixty lines to the cross-sectional image, two hundred forty raster lines are interpolated from the one hundred twenty actual data lines.

Figure 4:
FIG. 4 is a schematic diagram of the data line interpolation scheme.

As illustrated in FIG. 4, raster scan lines 151, 157, and 163 would display the actual data received on data lines, while lines 153, 155, 159 and 161 would not have data line information to be projected. Accordingly, the present system interpolates data onto the blank raster scan lines. One manner in which the preferred embodiment performs this interpolation is to average the information on actual data lines to produce the additional data lines to project on the empty raster scan lines. For example, empty line 159 would be filled by averaging the data on lines 157 and 163. In particular, the data on 157 being closer than the data on 163, the data on 157 would be weighted two-thirds and the data on 163 one-third. It will, of course, be recognized that many other interpolation schemes can be used, including those which average several lines beyond the two nearest lines, or including those schemes which include averaging several points along on actual data line to produce a single point on one of the empty raster scan lines.

It will further be appreciated that in the A-scan mode the echoes will normally be intermittent which causes the transducers to produce a set of intermittent pulses. The intermittency of these pulses would normally cause the output to appear as a series of dots. The current invention, however, transforms the data into a more readily viewable form for the technician by connecting these dots to a single line.

It should be pointed out that most normally the transducer array will be held horizontally above the object or patient to be examined. This will produce a set of vertical data lines indicative of the interfaces or density gradients along vertical lines within the object. Since these data lines are displayed as raster scan lines on a normal TV screen, it has been found aesthetically more pleasing to turn the picture tube of the TV monitor 90° so that the raster scan lines are also vertical. In this manner, the display on the TV monitor has the same orientation as the object or body examined.

Figure 5:
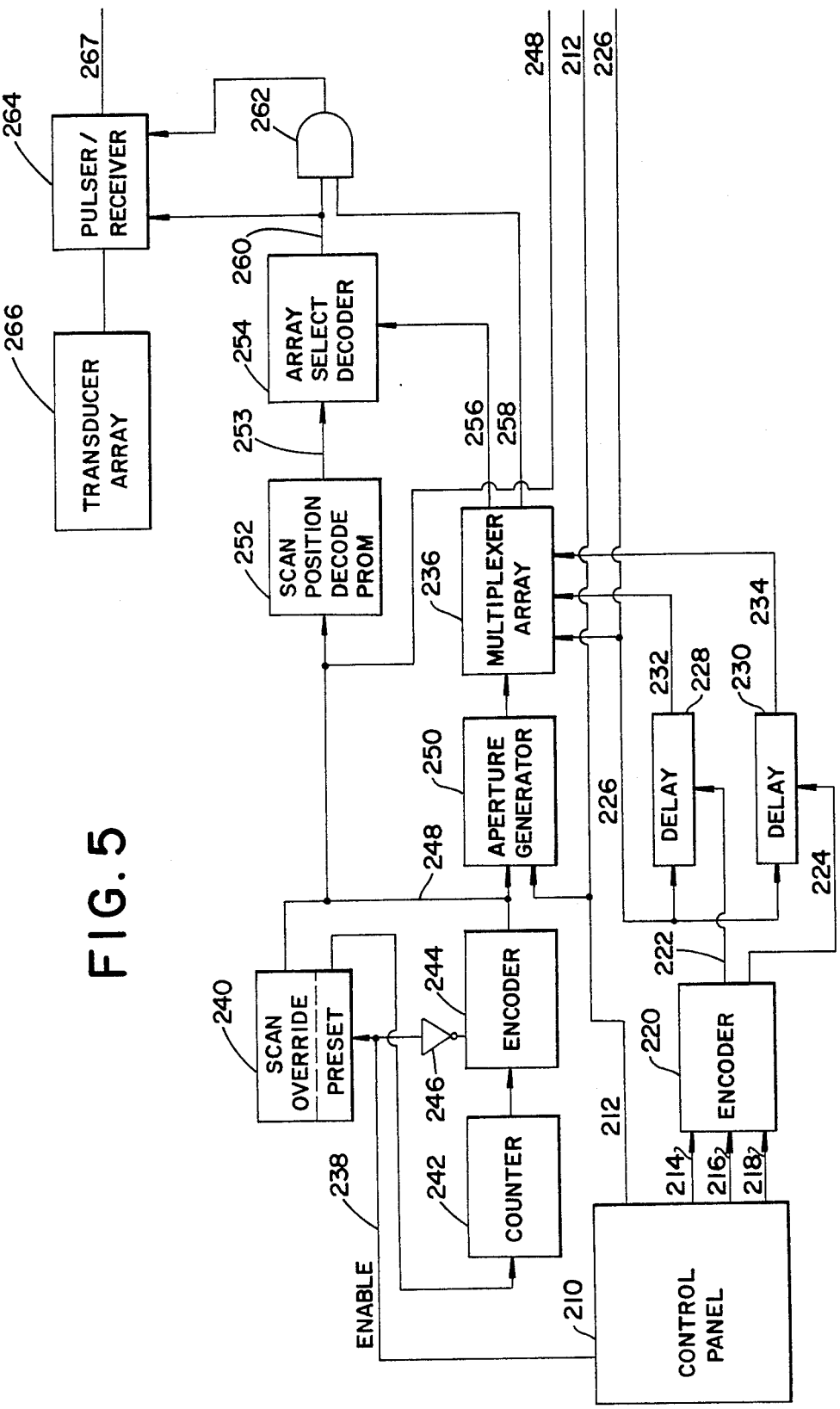
FIGS. 5 and 6 are a block diagram of the overall circuit of the preferred embodiment.
Figure 6:
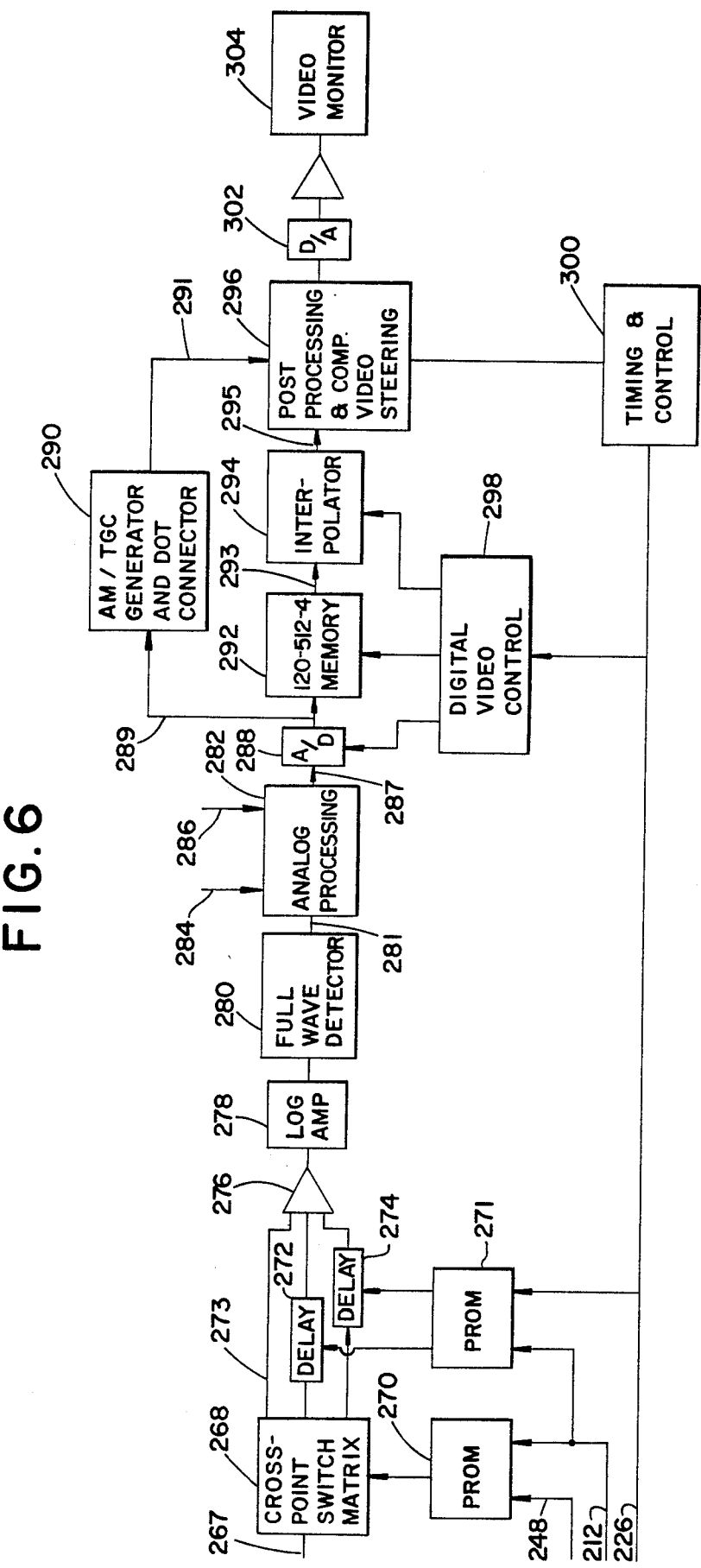

Going now into more detail, connecting FIGS. 5 and 6 illustrate in block diagram form the circuitry of the present invention. It is this circuitry which enables the above mentioned unique function and modes of operation to be achieved.

Block 210 represents the front or operator control panel. Here the operator would have an array of controls to select the mode of operation, the focus, the depth of field, the aperture width, the mode of video output, etc. The front control panel includes aperture width selecting means which produces a width signal on line 212 which indicates the number of transducers per group. On lines 214, 216 and 218, respectively, electrical representations of (1) the array of transducers actually being used, (2) the region of interest, i.e. the depth, and (3) the field selected are transmitted from the control panel to an encoder 220, such as a pair of 256×4 programmable read only memories. The encoder 220 responsive to the input of lines 214, 216 and 218 programs the length of the delay caused by delay elements 228 and 230.

The delay will vary with the spatial arrangement of the transducer elements in the array, the medium observed, the frequency of the sound waves, and the depth to be examined. Generally, one delay is the time necessary for a wave to traverse the distance 126 in FIG. 1B, and the other delay the time necessary to traverse the distance 128. By simple geometry, it can be seen that $T_{126}=1/V(B-\sqrt{B^2-3C^2})$ and $T_{128}=1/V(B-\sqrt{B^2-4C^2})$. $T_{126}$ is the time corresponding to distance 126 which is the delay time for a transmit pulse on 118. $T_{128}$ corresponds to distance 128 and the delay time for a transmit pulse on 116. V is the velocity of sound in water, (1540 meters per second.) B is the distance from 120 to 125 and is the focal distance. The center to center equal spacing of 112, 114, 116, 118 and 120 is the distance C. A typical delay for five transducers is zero for the outermost pair, 90 nanoseconds for the middle pair and 180 nanoseconds for the innermost transducer.

These delay elements hold up clock or timing pulses from timing and control circuit 300 on line 226 for the preselected period before allowing delayed timing pulses to go out on lines 232 and 234, respectively. Thus, three pulse trains will be fed into a multiplexer 236 (such as a 74S153 multiplexer) on lines 226, 232 and 234, each pulse train being slightly delayed or advanced relative to the other two.

Thus, encoder 220, control circuit 300, and delay element 228 and 230 for a focus selecting means for producing timing signals on lines 226, 232, and 234 for indicating the relative timing between actuations of transducers in each group in order to focus and aim the resultant ultrasonic wave.

Encoder 244 controls the scanning order of the transducer elements. It can be set to activate groups of transducers sequentially or, as in the preferred embodiment, activate the groups of transducers nonsequentially. By activating, for example, elements 1 to 4, then group of elements 25 to 29 and then elements 2 to 5, a great reduction in the amount of noise and spurious signals is achieved. Counter 242 causes encoder 244 to activate each sucessive group of transducers. Programmable read only memory 240 performs two functions. First, it presets the counter 242 so that counter 242 and encoder 244 start activating transducers at the beginning of an activation cycle. Second PROM 240 can override encoder 244 and signify a specific center for a group of transducers. This override would be used to produce an A-scan display or a time gain display, etc. A control line 238 in conjunction with inverter 246 provides an enable signal, either PROM 240 or encoder 244. PROM 240 and encoder 244 are both connected to line 248, the signal on which will indicate the center point of the group of transducers being activated. Thus, PROM 240. counter 242, and encoder 244 comprise a location selecting means for serially producing location signals on line 248 which indicate the location relative to the array of a preselected position (e.g. center) in a group of transducers to be actuated to transmit an ultrasonic wave.

Aperture generator 250 is connected to the control panel 210 by line 212 on which information concerning the aperture, i.e. number of transducers per group, is transmitted. Thus, the signal on line 248 determines the center of each group and the order in which the groups are to be pulsed, and the signal on line 212 determines the number of transducers per group. The output from aperture generator 250 then goes to multiplexer 236 in which the scan information is combined with the clock pulse and delayed clock pulse information. The multiplexer matches the appropriate delay with each element within a group and produces equal encoded activation signals on lines 256 and 258.

The preferred embodiment uses a transducer array of sixty four elements which are divided into four sections of sixteen. The signals on line 258 from multiplexer 236 enable the actuation of the appropriate section position or positions within all four sections of sixteen elements. For example, it may enable the first transducer in every section of sixteen. However, it would always "enable" the corresponding transducers in each of the four sections. It will be appreciated that other numbers of transducers can be used as well as other sizes and numbers of sections. With sixteen elements per section, groups of up to sixteen elements can be used together, yet with four sections the amount of hardware is cut to a quarter. The aperture generator 250 and multiplexor 236, along with delay elements 228 and 230 comprise section position means for providing an indication of the section positions for each of the groups.

Figure 7A:
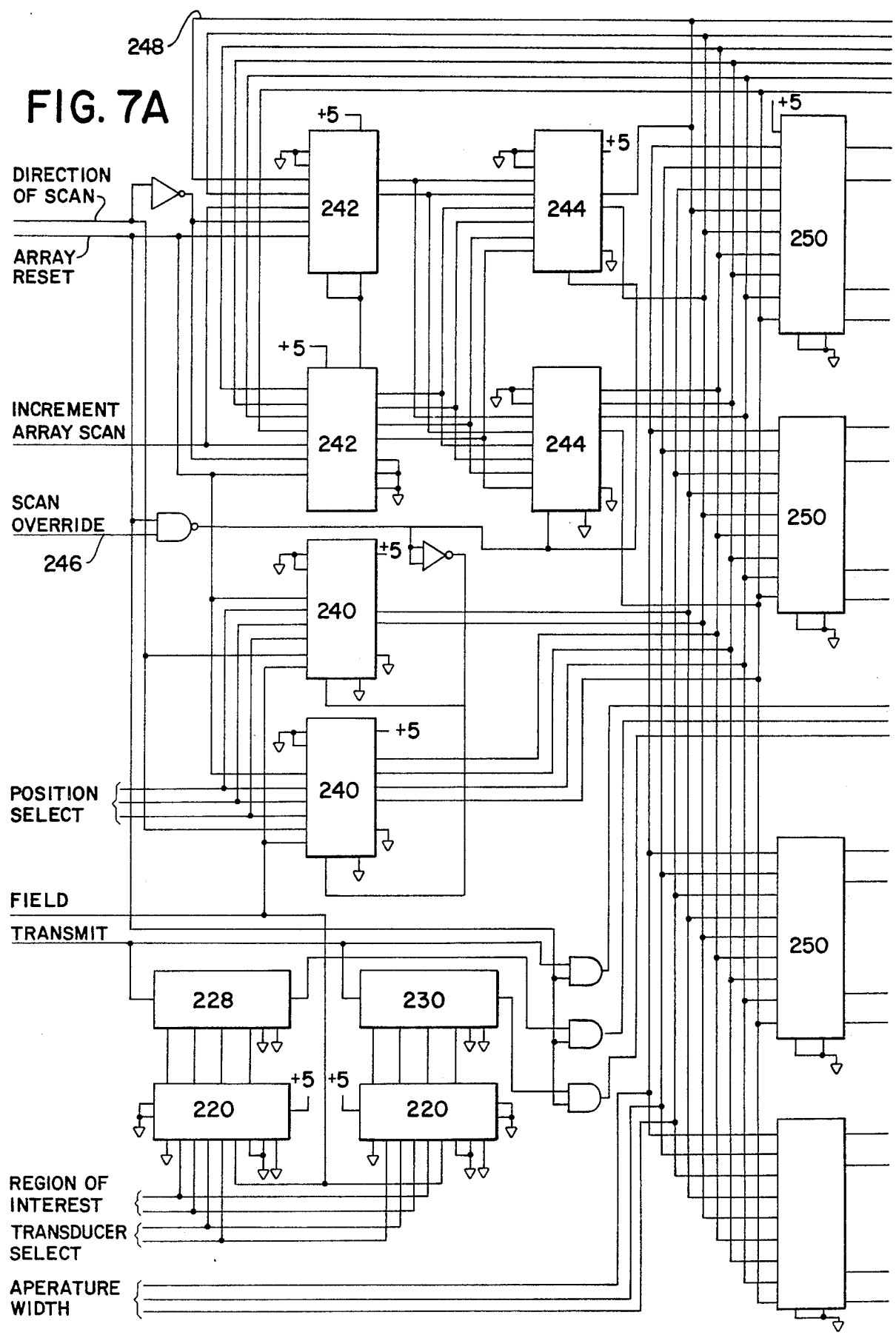
FIGS. 7A and 7B are two halves of a more detailed block diagram of the pulser/receiver circuitry of FIG. 5.

The functioning of elements 252, 254, 262, 264 and 266 will be further discussed in relation to FIGS. 7A and B which is a more detailed representation of these elements. In brief, however, aperture generator 250, scan position decoder PROM 252, array select decoder 254, multiplexer array 236, and gates 262 form a group selecting means which receives the location or center signal on line 248, the width signal on line 212, and the focus signals on lines 226, 232, and 234. From these signals the group selecting means selects the transducers in the array to be actuated to form the group as well as the relative timing between actuation of the transducers within the group.

In FIG. 6, a programmable read only memory 270 has two inputs; one is line 248 which, as indicated above, provides a signal indicative of the center of the group of transducers activated, and the other is line 212 which provides a signal indicative of the aperture width. In accord with its program, PROM 270 controls crosspoint switch matrix 268 to channel data from receiver 264 on line 267 into the appropriate delay circuits 272, 274 or no delay line 273. The data in matrix 268 has not yet been filtered to remove pulses corresponding to echoes from interfaces not on the data line. To accomplish this, the data from each transducer or transducer pair is fed through a filter section composed of no delay line 273, two delay circuits 272 and 274 with a delay time the same as 228 and 230, respectively, and a summing amp 276. PROM 271 controls the delay circuits 272 and 274. A signal on line 226 from the timing and control circuit 300 determines the starting point of the delay period and a signal on line 212 indicative of the aperture size determines the duration of each delay.

As indicated above in discussing FIG. 1A, the echoes from an interface along the data line will arrive at transducers closer to the data line at a time before they arrive at transducers further from the data line. Accordingly, the electric pulses representing this same interface from transducers close to the data line will be ahead of those produced by transducers further from the data line. The purpose of matrix 268, line 273, and delay circuits 272 and 274 is to divide the pulse trains from the transducers into three groups—those close to the data line, for example a couple of millimeters; those far from the data line, for example 10 to 20 millimeters; and those midway. The matrix 268 channels these close, far and intermediate transducer position pulse trains into lines or delay circuits 274, 273 and 272, respectively. This brings the pulse trains into coincidence just as if all transducers were equidistant from the interface point on the data line.

It is, of course, appreciated that the same delay time will not bring pulses indicative of interfaces at opposite ends of the data line into coincidence. The difference in distance between respective transducers and a point on the data line very close to the transducer array is much greater than the difference in distance between respective transducers and a point on the data line far from the transducer array. To overcome this, PROM 271 can be programmed such that the delay period decreases as the pulse train goes from data indicative of close interfaces to data indicative of farther interfaces. Alternately, the delay may be kept constant and only pulses indicative of data within the selected region will be generally in coincidence. Normally, the technician operating the device is interested only in data in a small region at about a known depth. This, combined with simpler equipment needed, greater accuracy at one given distance on the data line, and greater dependability, makes the constant delay embodiment more desirable in many situations.

The three signals are combined in summing amplifier 276. This causes the pulses in coincidence, i.e. those produced by echoes from interfaces on the data line, to be much greater in amplitude than pulses from spurious echoes. Low amplitude signals may be filtered out and discarded, or because of the great differences in magnitude, simply ignored.

Log amp 278 converts these signals into their logarithm form which simplifies processing because logarithmic signals need only be added and subtracted where nonlogarithmic signals need be multiplied and divided. From there, signals go through a full wave detector 280 which removes the carrier signal and analog processing module 282. Analog processing module 282 is controlled by the time gain control and dynamic range signals on lines 284 and 286, respectively, to control the gain and the dynamic range. The signals are then converted from analog-to-digital form by 6-bit analog-to-digital converter 288.

The signals representing the data lines are fed to 120×512×4 memory 292 in digital form. As indicated above, in the preferred embodiment the data lines are not read sequentially. The transducers are activated in such a manner that greatly spaced data lines are read in order to reduce interference from stray echoes. As the data line signals are entered into memory 292, they are rearranged into sequential order. Memory 292 can store the data for later viewing and/or transmit data for immediate video display and/or interface with a video tape recorder.

In the preferred embodiment, the one hundred twenty actual data lines are interpolated by interpolator 294 into three hundred sixty data lines in order to fill about three-fourths of a standard raster scan on the video monitor. Converting one hundred twenty data lines into three hundred sixty means, in effect, that there are two empty data lines between each actual data line. In the preferred embodiment, PROM implementation is used to compare 4-bit data decode function whereby these empty data lines are filled by a weighted averaging of nearby actual data lines.

The digital video control 298 which is sequenced by timing and control circuit 300 controls the movement of data through the analog/digital converter 288, memory 292, and interpolator 294. Control circuit 300 provides the horizontal and vertical timing, blanking timing, synchronization timing and auxiliary transmit.

The signals corresponding to other than the B-scan mode go through the processing circuit 290. In this circuit, the various data points are scaled to the appropriate amplitudes and a dot connector generates lines to connect the dots and provide a continuous line for display on the TV monitor. The B-scan data from interpolator 294 and the data representative of the other selected mode from 290 are fed into post processing and video generating unit 296, which puts in data blanking and synchronizes the data for raster scan timing. Signals then go to a digital-to-analog converter to provide the voltage gradients necessary to produce the gray tones on normal TV display. Finally, the data is displayed in visual form on TV monitor 304. Alternately, the signals from converter 302 can be interfaced with a video tape recorder and/or an appropriate camera for producing photographic negatives.

Figure 7B:
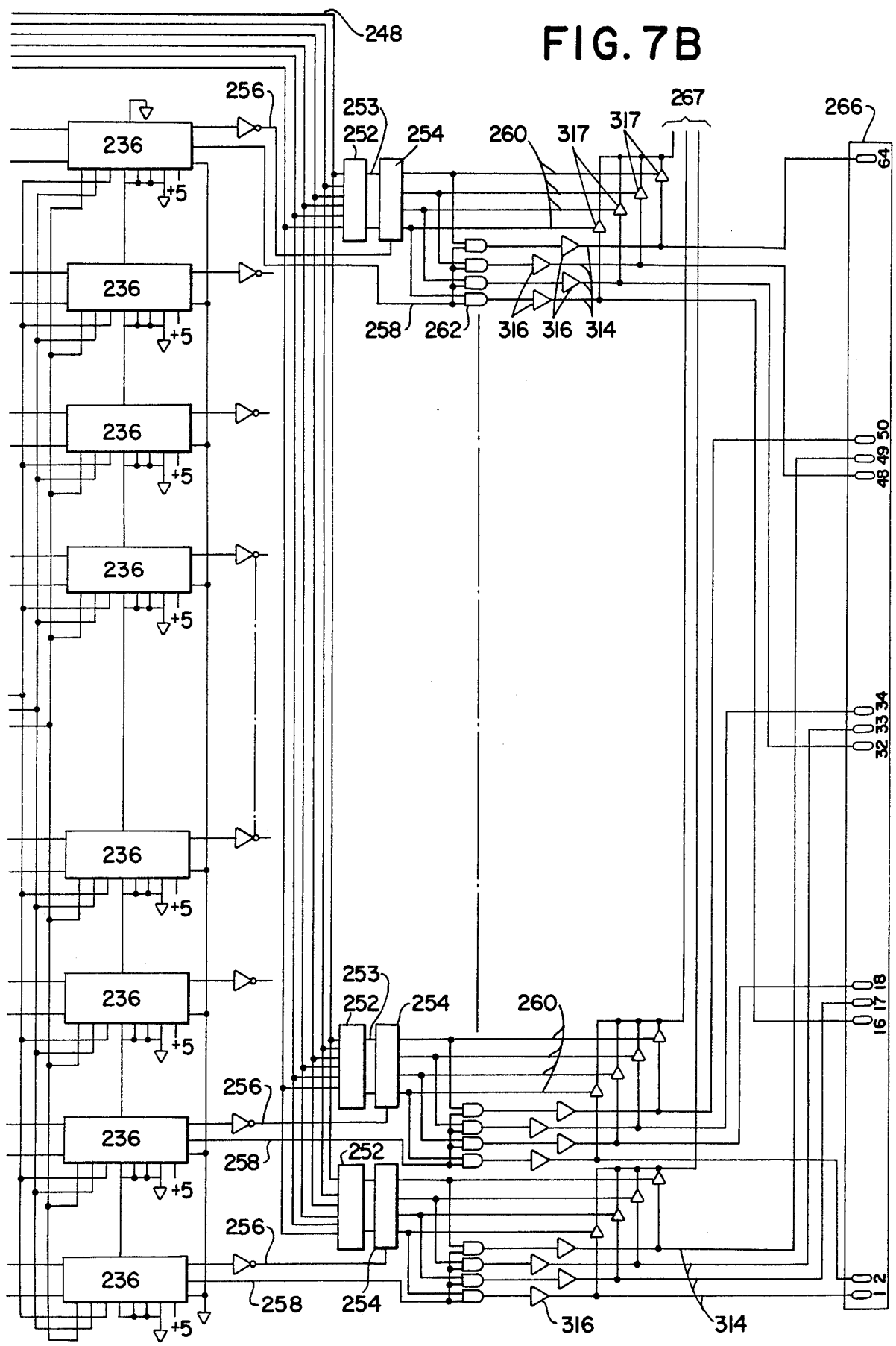

FIGS. 7A and 7B present a more detailed presentation of the pulser control circuitry. The left hand side of FIG. 7A has a series of inputs from the control panel for selecting the direction of the scan, incrementing the array scan, overriding the scan, resetting the array, selecting the center position for the group of transducers activated, designating the field, receiving a transmit signal for use as a timing flag, selecting the region of interest (depth of focus), selecting specific transducers and controlling aperture width. FIG. 7A shows the scan override/preset memory 240 as a pair of PROM's, such as 74S287 PROM's; counter 242 is shown as a pair of 74LS169 counters; encoder 244 is shown as a pair of 74S287 PROM's; aperture generator 250 is shown as a set of eight 74S571 PROM's; and multiplexer 236 is shown as a set of sixteen 74S153 multiplexers (FIG. 7B).

Outputs 256 of each multiplexer of 236 go to the enable input of one of the sixteen decoders of array select decoder 254; output 258 goes to one input of a group of four of the sixty four AND gates of 262. Bus line 248 supplies a six bit coded input to the sixteen decode PROM's 252 which control the center point of the group of transducers to be pulsed. The sixteen PROM's 252 supply a two bit input on lines 253 to the sixteen decoders 254. The PROMs 252 comprise section means for providing an indication of the sections in which each of the groups lie. Thus, for a transducer to be pulsed, there must be an appropriate input on the two lines 253 to one of decoders 254 to determine that the appropriate line 260 will be activatable, there must be an enable signal on the line 256 to the same decoder 254 to enable the decoder to pass the activation signal to line 260, and there must be an enable signal on the corresponding line 258 to allow the corresponding AND gate 262 to permit the activate signal to reach pulser 316. Through the appropriate combination of these controls, a specific one or ones of the transducers can be actuated. The decoders 254, gates 262, and pulsers 316 comprise actuating means responsive to the section indication from PROMs 252 and section position indication from multiplexors 236 for actuating the transducer elements which comprise each of the groups.

By way of example, in order to activate just transducer 64, the two lines 253 at the top of decoder 254 would supply the appropriate binary code which would cause a pulse on the top line 260. The top multiplexer 236 in FIG. 7B sends out a transmit signal which may be delayed by the time set in delay 228 or 230 on line 256 which enables the top encoder 254 to put a pulse on top line 260 at the appropriate time. The top multiplexer 236 also sends an enable signal, positive pulse, to the top four AND gates 262. The top AND gate passes a positive pulse to the top pulser 316 which sends a pulse to transducer 64 in array 266.

The actuation of a pulser 316 sends a short electrical signal on one of line 314 which causes one of the transducer elements to resonate for a fixed, very short period of time creating a short burst of sound. Normally, the pulse is a one-half cycle pulse, which for a frequency of 3.5 Mhz would be about 130 nanoseconds. The sound waves propagate through the body and, upon striking an interface or some other change of medium, are in part reflected. The reflected sound waves bounce back towards the transducers, strike the transducers and cause them to resonate, which in turn produces an electrical signal, again on line 314. These electrical signals go through gated receivers 317 which are enabled by the enable signals on lines 260 from decoder 254. Only those gates corresponding to transducers to which decoder 254 sent an enable signal are enabled to pass data. Thus, each of the sixteen output lines 267 will have a series of output pulses representative of the time between when the pulse was transmitted and when each of the one or several echoes was received. The amplitude of each pulse will be indicative of the nature of the change of medium at each interface and the time between pulses will be indicative of the relative distances between the interfaces. As discussed above, in regard to FIG. 6, the output data on line 267 is transformed into a series of data lines, placed in sequential order and displayed on a video monitor.

Figure 8:
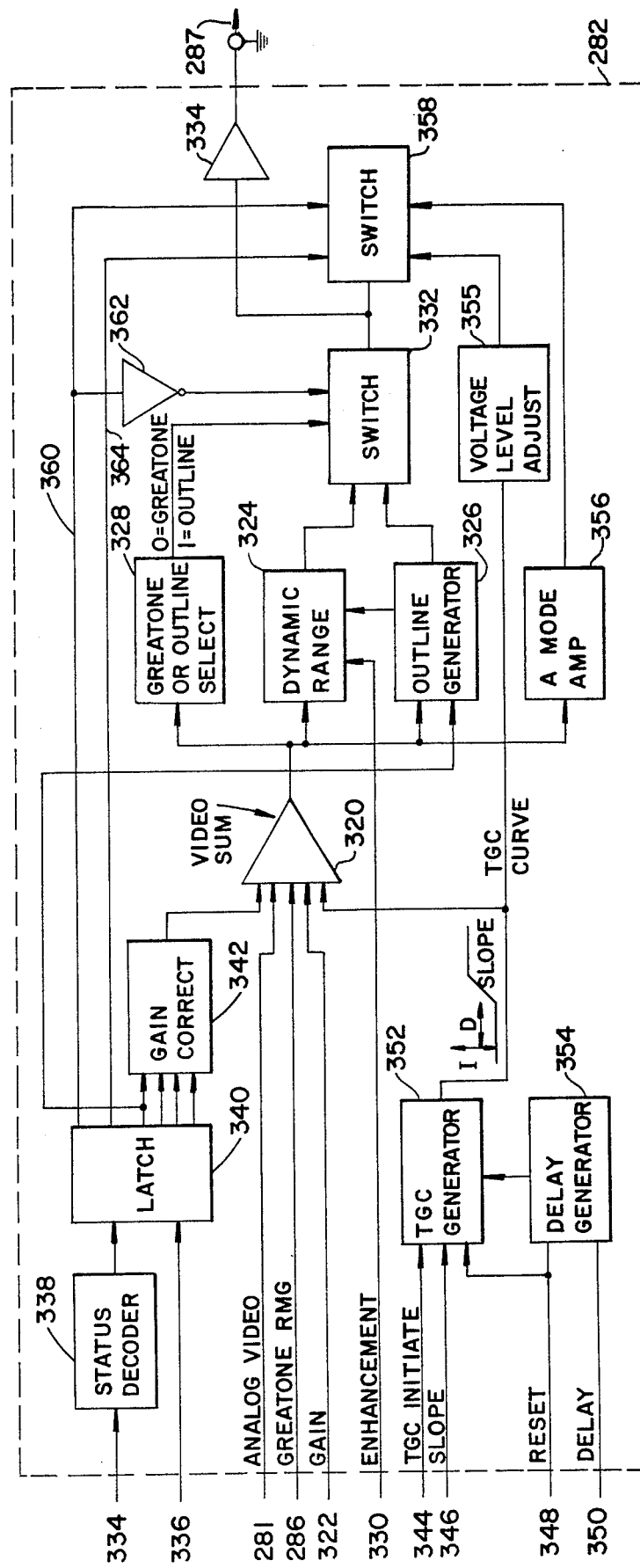
FIG. 8 is a block diagram of the analog processor module of FIG. 6.

FIG. 8 is a block diagram of the analog processing block 282. Line 281 is the analog video signal from the full wave decoder 280. Line 286, as discussed in connection with FIG. 6 in less detail, is a dynamic range control which sets the gray tone range. Line 286 originates at an 11 position switch located in the front panel. This signal along with the analog video signal is applied to video summing amp 320 to adjust the dynamic range. Line 322 also originates from the front control panel and is used to set the gain for the overall system.

Signal from the summing amp 320 goes to the dynamic range block 324, the gray tone or outline select block 328, and the outline generator 326. The gray tone range block 324 is a multiplier voltage control and, in this case, a log amp. Outline generator 326 is a comparator with a one shot on the output. Gray tone or outline select block 328 is a bistable device which in one state controls switch 332 to select the gray tone signal from dynamic range block 324, and in the other state controls the outline generator 326 to select the outline signal. The video signal from switch 332 goes into an output amp 334 and on to line 287 which connects the analog-to-digital converter.

The system status bus lines 334 and 336 provide system status information to the analog processor. With decoder 338 and latch 340, these bus lines are decoded to ascertain the region of interest, aperture, field and mode of scan. Read only memory 342 provides gain correction for summing amp 320. This corrects for differences in gain caused by the different number of transducer elements scanned when N and N+1 transducers per group are activated.

The TGC initiate line 344 comes from the front control panel and is used to control the charging rate of the time gain control slope. Line 346 is also a slope control from the front panel. Both lines 344 and 346 act to control the time gain control generator 352. Line 348 is a reset line from timing and control circuit 300 which is used for resetting time gain control generator and the dynamic range amplifier. Line 350 carries the analog delay signal from the front panel which sets delay for the time gain control signal with delay generator 354. The time gain control signal from time gain control generator 352 goes to the video summing amp 320 and to a voltage level adjusting circuit 355. From a voltage level adjusting circuit 355, time gain control signal goes to a switch 358. Also coming to switch 358 is the A-mode signal from A-mode amplifier 356. The latch circuit 340 sends out a select signal on line 364 to cause switch 358 to select between the A-mode signal and the time gain control signal. Line 360 from latch 340 enables either switch 332 or switch 358. Line 360 has an inverter 362 going to switch 332 so that the signal on line 360 is an either/or but not both type signal. Thus, output line 287 carries a B-mode video signal, an outline B-mode signal, an A-mode signal or a time gain control signal.

Figure 9:
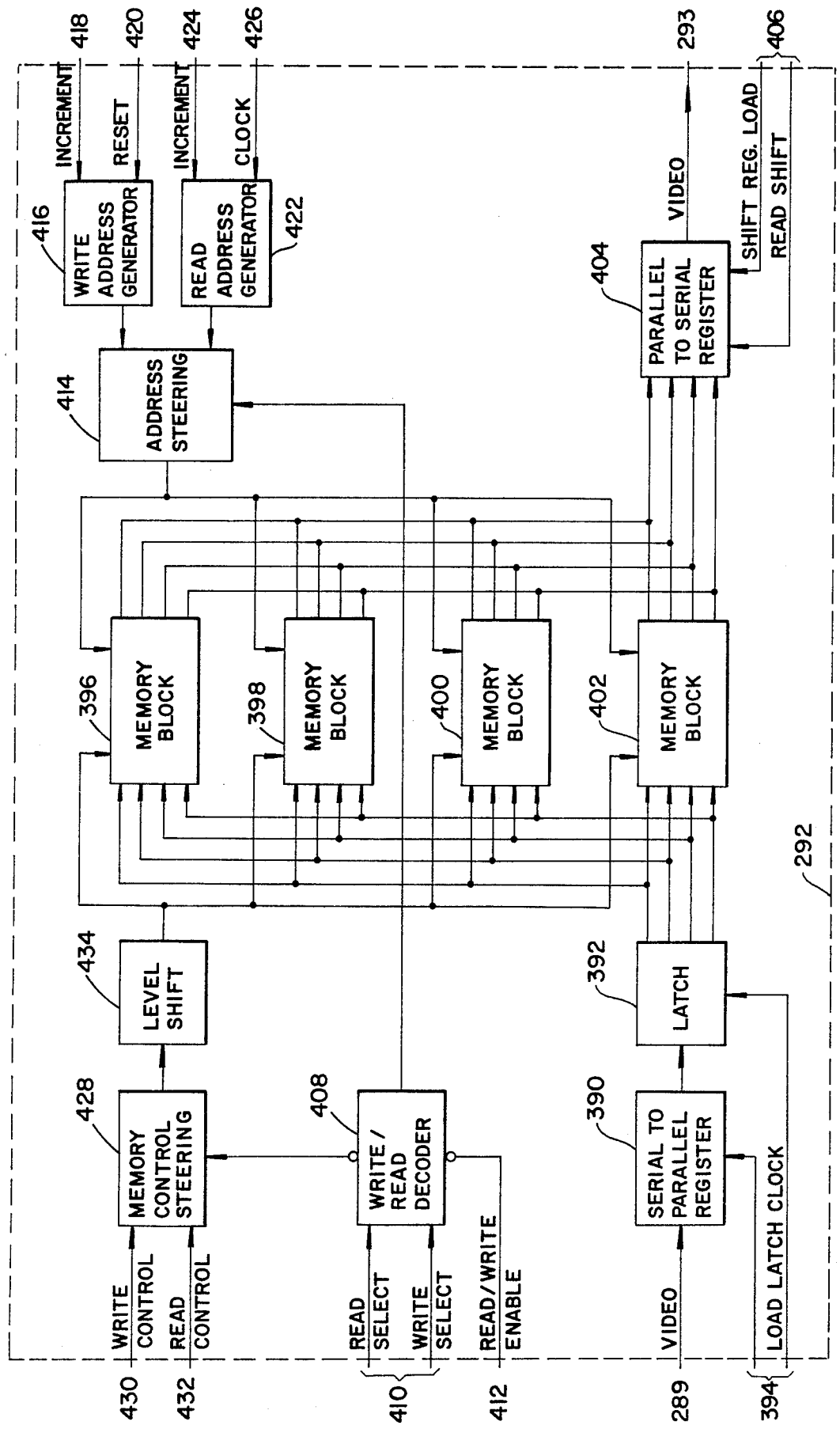
FIG. 9 is a block diagram of the memory module of FIG. 6.

FIG. 9 is a block diagram of the memory module 292. The input video signal on line 289 from a conventional analog-to-digital converter 288 is fed into data register 390 which converts it from serial to parallel form and from there to latch module 392. Clock signals on lines 394 load the video signal into register 390 and into latch module 392. From latch module 392, signals are fed to memory blocks 396, 398, 400 and 402. The output of the memory blocks goes to parallel to serial converting registers 404. A pair of control signals on line 406 from the digital video control 289 clock the video data through register 404 onto video output 293.

Looking now to the addressing mechanism for the memory module, read block select signals and write block select signals on lines 410 from digital control 298 and read/write enable signals on lines 412 also from control block 298 are fed to read/write decoder 408. Decoder 408 supplies the select input to address steering module 414 which addresses the four memory blocks 396, 398, 400 and 402. The inputs between which the signal from 408 selects in the address steering module are from write/address generator 416 and read/address generator 422. The inputs to the read/address generator are the increment array scan signal on line 418 which is the signal which causes a group of transducers in the array to shift to the next group, and the array reset control signal on line 420. The array reset control signal resets the memory to the first address position and is the same signal which would reset the transducer array back to the first group of transducers. The input to read/address generator 422 comes from the increment read/address signal on line 424 from the control unit 298 and a clock pulse on line 426. Address information is also developed in multiplexer 428 which is the memory control steering module. The memory control steering module 428 receives a read control on line 430 which includes address enable signals, precharge write signals and write data transfer signals. Further, memory control steering module 428 receives read control signals on line 432 which include read/address enable signals, precharge read signals, and read data transfer signals. A read or write enable control from decoder 408 puts memory control steering module 428 into the appropriate read or write mode. Level shift module 434 adjusts the voltage of the control signals from multiplexer 428 before applying them to control gates of the memory blocks.

FIG. 10 is a block diagram of the A-mode and time gain control generator of module 290 and the interpolator 294. Looking first to the interpolator, video signal on line 293 from the memory module 292 is fed to multiplexer 440 and multiplexer 442 as well as latch modules 444, 446 and 448. Input 450 receives the input from the system status bus line which controls whether the signals on line 293 or line 289 are to be processed. From multiplexers 440 and 442, video signals are sent to $2 \times 256 \times 4$ memorys 451 and 452. The outputs from memorys 451 and 452 are fed to latch module 444 and 446, respectively. In this manner, the latch modules are caused to store, temporarily, successive pairs of adjacent lines of video data. Read only memory 454 averages together the data stored in these two latch modules to produce two interpolated video lines. The two lines of interpolated video data are combined with one line of actual video data from latch module 448 in multiplexer 456 to produce three lines of output video signals on line 295.

When the signals on system status bus line 450 indicate that the display is to be a time gain control display or an A-mode display, then multiplexers 440 and 442 are caused to read the video signal on line 289 from the analog-to-digital converter. The outputs of the multiplexer are again fed through the memorys 451 and 452. This time, the output of the two memory units produces a video signal on line 468 which goes to the dot connect module of FIG. 11 and to line 291.

The addressing of signals into memorys 451 and 452 is controlled by nine-bit counter 458. Counter 458 has input lines 460, 462, 464 on which it receives reset signals, enable signals, and increment signals, respectively. Thus, with each line of data, the counter is stepped by one position and the address into memorys 451 and 452 modified. There is a second output 466 from the nine-bit counter which provides a reset signal to control 298 when the counter has gone its full cycle indicating a full set of data has been processed through the controlled module.

FIG. 11 is the dot connect module of module 290. The video input comes on line 468 from the video output of FIG. 10. The video signal goes into a latch 470 which is controlled by a clock pulse on line 474. The clock pulse on line 474 further steps the data from latch 470 into latch 472. This produces a pair of output signals on lines 476 and 478 which contain the same data except for the data on line 476 is one clock pulse behind the data on line 478. Latch 480 has an input on line 482 from the system status bus line and is clocked on line 484 by the master clock of the system. The output of latch module 480 on line 486 is a function of the input from the system status bus line. In a time gain control or A-mode display, there will be a horizontal position count on line 486 which indicates position within a horizontal line of data. The signals on lines 476 and 486 are fed into six-bit comparator 488 and the signals on lines 478 and 486 go to comparator 490. The output of comparators 488 and 490 are fed to encoder 492, to latch circuit 494, and through an amplifier to produce the white out strobe signal on line 291. If the horizontal line count is the same as the data position signal, this indicates that there is a point of data at that position and the white out strobe signal will be on. If the horizontal line count is both greater than the data position (line 476) and less than the next data position (line 478), this will indicate that the horizontal count is between a pair of data positions and, accordingly, a white out strobe signal will again be caused to occur. Similarly, if the horizontal count is both less than the data position and greater than the next data position, this will again indicate that the horizontal count is between two data positions and a connecting white out strobe signal will be generated.

Figure 12:
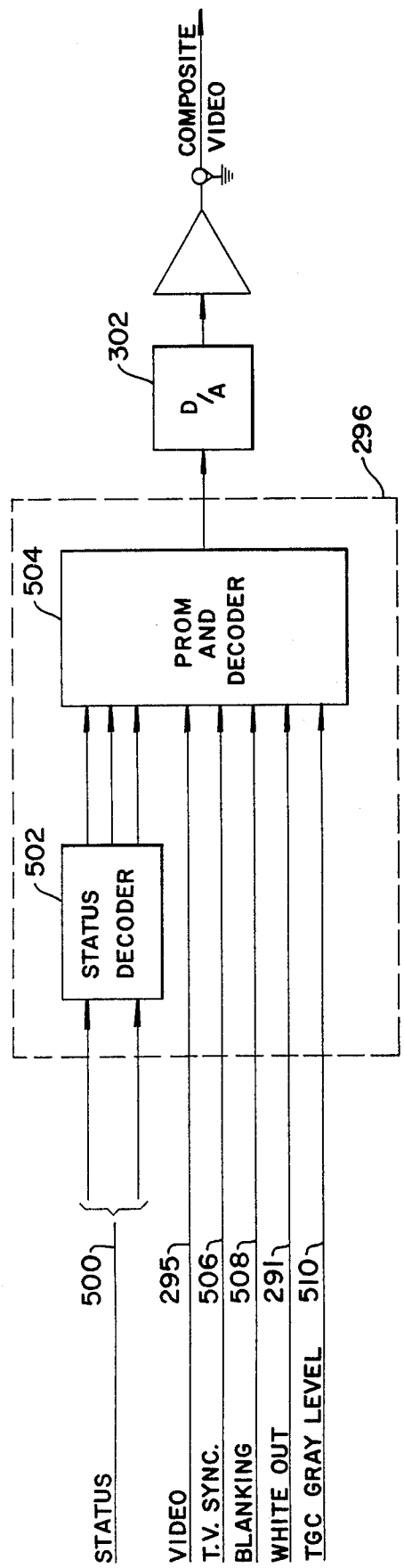
FIG. 12 is a block diagram of the post processing steering and composite video steering module of FIG. 6.

FIG. 12 illustrates post processing and composite video steering module 296 and the digital-to-analog converter 302. The inputs into the module include the system status information on line 500 into status decoder 502 which produces a series of output controls for the PROM and decoder 504. These signals can include a video invert which changes blacks to white and whites to black, or signals which prohibit certain tones of gray from being displayed, etc. The input into the PROM and decoder 504 includes a video signal from the interpolator on line 295, TV synchronization signals on line 506 and TV blanking signals on line 508. The PROM and decoder 504 can combine all these into a signal which, when fed through digital-to-analog converter 302, produces an appropriate composite video signal. In the A-mode or TGC-mode, the white out signal on line 291 from the dot connector and TGC-gray level signal on line 510 which codes a gray level to be displayed in the time gain control region of the display are also fed into PROM and decoder 504. These signals also, when fed through digital-to-analog converter 302, form a composite video signal. This composite video signal is connected to the video monitor 304 of FIG. 6.

FIG. 13 is a block diagram of the digital video control module 298. Multiplexer 520 selects among the many data inputs. Data inputs include a horizontal drive input, an auxiliary transmit input, a field input, a terminal count input (reset from line 466 of FIG. 10), a vertical retrace input, a start read input, and a field status input. The output from the multiplexer 520 goes to a latch circuit 522 whose output goes to a series of read control PROM's 524 through 530. The output from PROM 524 is fed back into latch 532 and into a second latch 522. The output of latch circuit 532 provides a second input to the read control PROM's 524 through 530. PROM's 524 and 525 provide a feedback data select signal to the multiplexer 520. Multiplexer 520, latch circuits 522 and 532, and PROM's 524 through 530 form basically an algorithmic sequential state machine. The output of PROM 530 includes line 406 which supplies the shift register load signal for register 404 and line 424 which increments the read/address generator 422 of FIG. 9 and lines 460 and 462 which provide the enable and increment signals to nine-bit counter 458 of FIG. 10. PROM's 528 and 529 provide input signals to latch 534 which provides write enable A and write enable B output signals. PROM's 527 and 528 provide an output signal which controls latch 536. Latch 536 provides an enable signal for the dot connect circuit of FIG. 11 and a read shift signal on line 406 for shift register 404 of FIG. 9. PROM's 525 and 526 provide an output signal to latch 538 which produces read control signals 432 and read enable signal 412 to the inputs of FIG. 9. Module 539 is a clock select module which selects between two clock pulses and provides an output which clocks latches 534, 536, 538 and 540. Latch 542 receives a write inhibit signal, transmit signal and load latch clock signal on line 394. It provides an output to write control PROM's 544, 545 and 546. PROM's 545 and 546 control latch 548 which produces a write control output signal 430 which goes to the multiplexer 428 of FIG. 9. The load latch signal and clock signal go to a counter 550 which produces first input to a latch module 552. The second input to latch 552 comes from PROM's 544 and 545. The output of latch 552 provides a second input to write control PROM 544 through 546.

Figure 14:
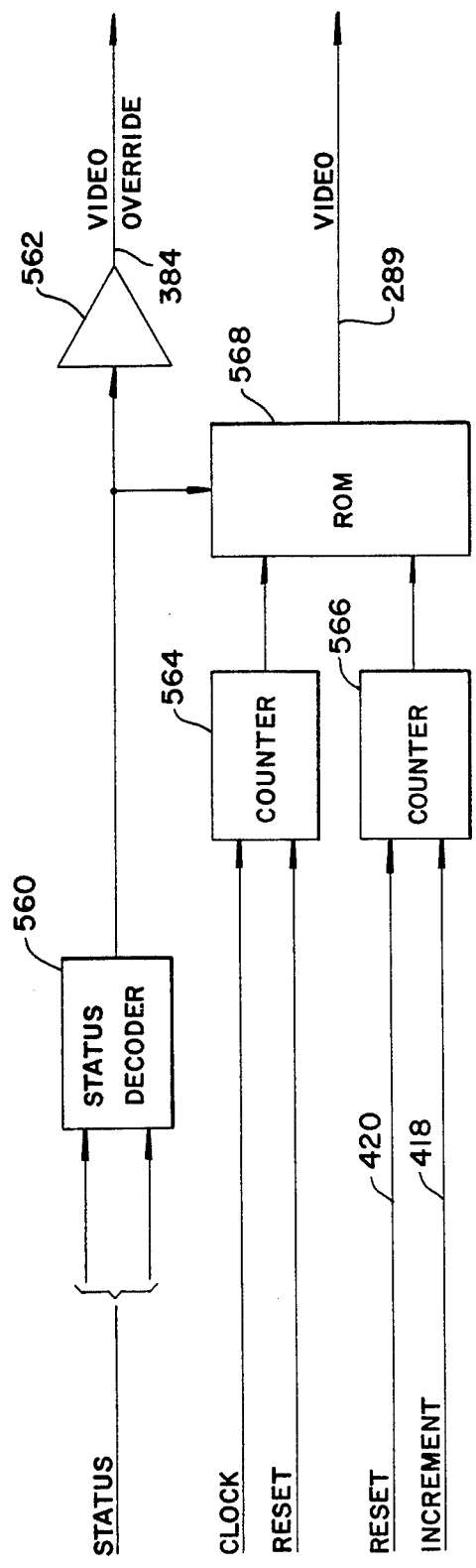
FIG. 14 is a block diagram for a test pattern generator.

FIG. 14 shows a test pattern generator which can be plugged into the circuit to provide a test pattern on the video monitor. This module has a system status input to a status decoder 560 which, through an amplifier 562, produces a video override signal on line 384 to FIG. 9 to shut off a flow of actual data from the transducer head through the analog-to-digital converter. The test pattern generator has a counter 564 which receives clock pulses and write control reset signals. There is a second counter 566 which receives the same ray increment signals on line 418 as FIG. 9 and the same reset signal on line 420 as FIG. 10. Memory 568 receives the output of the two counters and is controlled by the status decoder 560. In turn, memory 568 produces a standardized test pattern on its output which is connected to video line 289.

The specific hardware of the preferred embodiment is shown only by way of illustration. It is not intended that the invention be limited to this specific physical form—rather, it should be appreciated that there are numerous equivalent systems and subsystems which can be substituted for various individual circuits or groups of circuits in the preferred embodiment. An appropriately programmed multi-purpose computer, for example, could be substituted for any module or modules of the system, except the TV monitor and transducer array. The invention covers the above circuitry and the equivalents thereto as set forth in the claims as follows.

The claimed invention is:

1. An ultrasonic receiving system comprising:
   an array of transducer elements operable in a plurality of groups for receiving echoes from ultrasonic waves, each group producing electrical signals corresponding to the echoes from each of the ultrasonic waves which impinge thereon, wherein the signals from the echoes from each of the ultrasonic waves form one of a plurality of data lines, and each of the groups have a characteristic center position relative to an end of the array, whereby each data line corresponds to one of the center positions;
   ordering means operably connected with the transducer array for arranging the data lines into a set of data lines in order of increasing distance from said end to the array of the corresponding center position;
   interpolator means for averaging adjacent data lines in the set to produce at least one interpolated data line corresponding to a center position between the center positions corresponding to the adjacent data lines; said interpolator means comprising a first latch means for receiving a first data line, second latch means for receiving a second data line, averaging means connected to said first latch means and said second latch means for averaging the data line received in the first latch means with the data line received in the second latch means and producing at least one interpolated data line;
   third latch means for receiving the interpolated data line, first multiplexor means connected to said averaging means and said third latch means for arranging each interpolated data line within the set in order between the data lines which were averaged to produce each interpolated data line.

2. The receiving system of claim 1 wherein the interplator further includes:
   second multiplexor means for receiving serially each data line of said set,
   memory means connected to said second multiplexor means for storing the data lines in said set and for supplying data lines to said first latch means and said second latch means.

3. The receiving system of claim 2 further including a visual display means for transforming each data line of said set into one line of a visual display.

4. An ultrasonic diagnostic apparatus comprising:
   an array of transducer elements for converting electrical signals into ultrasonic waves upon actuation and for converting ultrasonic waves into electrical signals, said array being divisible into at least two sections, each section being composed of transducer elements disposed at section positions within that section, the section positions in each of said sections corresponding to the section positions in the other of the sections;
   means for selecting groups of transducer elements, each of the groups comprising one or more transducer elements which are actuated proximate in time to generate an ultrasonic wave; said selecting means comprising section position means for providing an indication of the section positions for each of the groups, section means for providing an indication of the sections for each of the groups, and actuating means responsive to the section indication and section position indication from said section position means and section means for actuating the transducer elements comprising each of the groups, said actuating means being operatively connected with said section position means, said section means and said transducer array whereby the actuating means determines the transducer elements which constitute each group based on the section and section position indications; and
   means for processing electric signals produced by the transducer elements upon receiving ultrasonic echoes said processing means comprising means for receiving the electrical signals; delay means for adjusting the signals to compensate for a longer path travelled by parts of the echo received by some transducer elements, the adjusted signals produced by the echoes from each transmitted ultrasonic wave forming a data line; means for sorting the data lines according to the position along the array of the center of the corresponding transmitted wave; means for storing the sorted data lines; and means for interpolating the stored data lines to increase the number of data lines; and video display means for displaying the stored and interpolated data lines as an image indicative of acoustically reflective interfaces in an examined object.

5. An ultrasonic diagnostic apparatus comprising:
   an array of transducer elements for generating ultrasonic waves when activated with an electrical pulse and for generating an electrical signal upon receiving an incident ultrasonic echo;
   means for serially activating pluralities of transducer elements, each activated plurality generating an ultrasonic wave front, said activating means activating said pluralities in such an order that each activated plurality has no transducer elements in common with the preceding activated plurality;
   means for receiving electrical signals generated by said array upon receiving ultrasonic echoes from each wave front, the electric signals produced the the echoes from each wave front forming a data line;
   means for sorting said data lines according to the position of the center of the corresponding wave front; and means for storing the sorted data lines.

6. The apparatus as set forth in claim 5, wherein the activating means activates unique pluralities of transducer elements until wave fronts are generated having centers displaced by the spacing between adjacent transducer elements.

7. The apparatus as set forth in claim 5 wherein the activating means activates unique pluralities of transducer elements until wave fronts are generated having centers displaced by not more than half the spacing between adjacent transducer elements.

8. The apparatus as set forth in claim 5 further comprising interpolating means for interpolating adjacent data lines stored in said storing means to produce intermediate data lines, said interpolating means being operatively connected with said storing means, whereby the number of data lines is increased.

9. The apparatus as set forth in claim 8 further comprising a video monitor for displaying the data lines, said monitor operatively connected with said interpolating means.

10. An ultrasonic diagnostic apparatus comprising:
an array of A transducer elements, wherein A is an integer;
driving pulse generator means for generating a pulse of a predetermined amplitude and duration for actuating a transducer element;
means for enabling groups of G driving pulse generator means to cause G of the transducer elements to be actuated to form an ultrasonic wave front, where G is an integer; and
delay means having a non-delay path and D delay increments having different delays, where D is an integer less than $(G/2)-1$, said delay means operatively connected between said enabling means and said driving pulse generator means for delaying the enabling of some of the driving pulses generated by D different delays whereby the ultrasonic wave front is focused.

11. The apparatus as set forth in claim 10 further comprising:
second delay means operatively connected with said array for receiving electrical signals produced by the transducer elements upon the transducer elements receiving ultrasonic echoes, said second delay means comprising a non-delay means comprising a non-delay path and E delay paths, where E is an integer less than $(G/2)-1$;
means for selectively channeling each electrical signal through one path of the second delay means;
means for combining the electrical signals from each path of the second delay means; and
means for transforming the combined signals into a representation of a visual display.

12. The method of scanning an object with ultrasonic waves from an array of transducer elements to produce a representation of a region of the object comprising:
actuating a first group of transducer elements to generate an ultrasonic wave and allowing the transducer elements to receive echoes from the ultrasonic wave to produce signals indicative thereof;
actuating subsequent groups of transducer elements of the array one group at a time to generate ultrasonic waves, each subsequent group having no transducer elements in common with the immediately preceding group and allowing the transducer element to receive echoes from each ultrasonic wave to produce signals indicative thereof;
sorting the signals in order by the position of the center of the corresponding ultrasonic wave; and
processing the signals indicative of the echoes from ultrasonic waves to produce said representation.

13. The method as set forth in claim 12 wherein each group consists of a unique plurality of transducer elements.

14. The method as set forth in claim 12 wherein each group consists of N or N+1 transducer elements, where N is an integer.

15. The method as set forth in claim 14 wherein subsequent groups are actuated until all unique groups are actuated.

16. The method of scanning an object with ultrasonic waves to form a representation of an image of the interior of the object comprising:
causing a plurality of groups of 2N+1 transducer elements of an array of transducer elements to transmit an ultrasonic wave front, one group at a time, where N is an integer;
after each transmission allowing the groups of transducer elements to receive echoes from the ultraonsic wave front and produce electric signals in response to the received echoes; and
processing the electric signals from 2N of the 2N+1 transducer elements which transmitted the ultrasonic wave from which the electric signals were produced by combining the signals from pairs of transducer elements to produce N time varying signals; subjecting the N signals each to one of less than N delays; and combining the delayed signals to produce a data line, whereby the data line comprises a series of pulses, the amplitude of the pulses being indicative of the reflectivity of an interface in the object and the time between the beginning of the data line and a pulse being indicative of the depth of the interface and whereby the plurality of data lines from the plurality of groups taken together form the representation.

17. An ultrasonic diagnostic apparatus comprising:
an array of electroacoustic transducers for converting electric signals into ultrasonic waves and converting ultrasonic waves into electric signals, transducers in the array being adapted to be actuated in groups sufficiently proximate in time to coact in generating the ultrasonic waves, each group comprising one or more transducers;
location selecting means for serially producing location signals, each location signal being indicative of a location relative to the array of a preselected position in a group of transducers to be actuated to transmit an ultrasonic wave, whereby the location means selects the location of groups relative to the array for serial actuation;
width selecting means for producing width signals, the width signal being indicative of the number of transducers per group;
group selecting means for selecting from the location signals and width signals the transducers in the array to be actuated to form each group, said group selecting means being operatively connected with said location selecting means and said width selecting means; and
pulsing means for actuating the transducers in each selected group, said pulsing means being operatively connected with said group selecting means and said array of transducers.

18. The apparatus as set forth in claim 17 further comprising:
focus selecting means for producing timing signals for indicating the relative timing between actuation of transducers in each group, the relative timing being selected to focus and aim the ultrasonic waves relative to the array, said focus selecting means being operatively connected with said group selecting means; and wherein said group selecting means further selects the relative timing between actuation of specific ones of the transducers forming each group in accordance with the timing signals.

19. The apparatus as set forth in claim 18 wherein said location selecting means comprises a programmable read only memory adapted to be programmed with a series of location signals and a counter means to address the memory for serially producing the location signals.

20. The apparatus as set forth in claim 18 wherein said focus means comprises a plurality of delay means for delaying a control signal, the control signal and delayed control signals being the timing signals.

21. The apparatus as set forth in claim 18 wherein said group selecting means further comprises means for gating each of said enable signals, said gate means being controlled by said timing signals, said gate means being operatively connected with said decoder means and said pulsing means.

22. The apparatus as set forth in claim 18 wherein said pulsing means comprises a plurality of pulsers, each of the pulsers being connected with one of the transducers in the array.

23. The apparatus as set forth in claim 18 further comprising means for processing the electrical signals produced by the transducers upon receiving ultrasonic echoes, said processing means being operatively connected with said array, and display means for displaying an image indicative of acoustially reflective interfaces in an examined object, said display means being operatively connected with said processing means.

24. The apparatus as set forth in claim 18 wherein each of said transducers comprises two tranducer means and electrical means for connecting the two tranducer means whereby the two transducer means operate in unison to convert electrical signals into ultrasonic waves and to convert ultrasonic waves into electrical signals.

25. The apparatus as set forth in claim 24 wherein each of said transducers is divided into two connected parts by a slot extending at least half way through the transducer, each of said connected parts being a transducer means.

26. The apparatus as set forth in claim 24 wherein said each of said two transducer means is a generally rectangular crystal of electro-acoustic material.

27. The apparatus as set forth in claim 17 wherein said preselected position which is indicated by the location signal is the center of the group.

* * * * *